United States Patent [19]
Loehndorf, Jr. et al.

[11] Patent Number: 6,094,437
[45] Date of Patent: Jul. 25, 2000

[54] LAYER TWO TUNNELING PROTOCOL (L2TP) MERGING AND MANAGEMENT

[75] Inventors: James R. Loehndorf, Jr., Crystal Lake, Ill.; Stanley T. Naudus, Jr., Springfield; D. Richard Miller, Jr., Reston, both of Va.; Chang-Shan Hsu, N. Potomac, Md.

[73] Assignee: ASC - Advanced Switching Communications, Vienna, Va.

[21] Appl. No.: 09/251,915

[22] Filed: Feb. 19, 1999

Related U.S. Application Data

[60] Provisional application No. 60/103,589, Oct. 9, 1998.

[51] Int. Cl.$^7$ ..................................................... H04L 12/02
[52] U.S. Cl. ........................................... 370/420; 370/463
[58] Field of Search .................................... 370/400, 401, 370/410, 420, 462, 463, 422, 352, 353, 354; 709/223, 224, 225, 226, 227, 228, 229, 230, 231, 250

[56] References Cited

U.S. PATENT DOCUMENTS

| | | | |
|---|---|---|---|
| 5,918,019 | 6/1999 | Valencia ................................... | 709/227 |
| 6,006,259 | 12/1999 | Adelman et al. ........................ | 709/223 |
| 6,011,910 | 1/2000 | Chau et al. .............................. | 709/229 |

*Primary Examiner*—Huy D. Vu
*Attorney, Agent, or Firm*—Whitham, Curtis & Whitham

[57] ABSTRACT

A system is provided for creating a tunneling service from the use of a traditional tunneling protocol, such as the layer two tunneling protocol (L2TP). In particular, the L2TP tunneling protocol, which is designed to go point-to-point between an L2TP Access Concentrator (LAC) and an L2TP Network Server (LNS), is abstracted so that L2TP becomes an access protocol to a tunneling service. A new L2TP tunnel merger and management (LTM) service is created which severs the tight configuration relationships between LAC and LNSs. Only a tight configuration between an LAC and its LTM edge device and between an LNS and its LTM edge device is required. An internal trunk protocol (INT protocol) carries needed information between LTM edge devices to establish ingress/egress L2TP access calls inside of separate L2TP access tunnels on opposite LTM edge devices. The addition of another LAC is accomplished by re-routing L2TP tunnels within the LTM service without reconfiguration of the LNSs, and the addition of another LNS is accomplished by re-routing L2TP tunnels within the LTM service without reconfiguration of the LACs. The LTM service determines the need for both additional trunk and access resources and establishes both new trunk/access tunnels to provide additional resources. The LTM service also determines excess resources on both trunk and access entities and releases trunk/access tunnels to provide the needed additional resources.

61 Claims, 8 Drawing Sheets

LAYER TWO TUNNELING PROTOCOL (L2TP) MERGING AND MANAGEMENT

CROSS REFERENCE TO RELATED APPLICATION

This application claims priority to U.S. Provisional Application Serial No. 60/103,589, filed on Oct. 9, 1998, by James R. Loehndorf, Stanley T. Naudus, Donald R. Miller, Chang-Shan Hsu for "Layer Two Tunneling Protocol (L2TP) Merging and Management", incorporated herein by reference.

DESCRIPTION

BACKGROUND OF THE INVENTION

1. Field of the Invention

The present invention generally relates to communication via networks and, more particularity, to managing a tunneling protocol. Tunneling protocols are widely used in modem day communication to allow a protocol to be tunneled over different physical, logical, or virtual mediums.

2. Background Description

One of the largest networks in the world is the Internet. The Internet is a network of worldwide-interconnected computers. One of the organizations that designs new protocols for the Internet is the Internet Engineering Task Force (IETF), and this group has developed/standardized such protocols as IP (Internet Protocol) as well as many others. Of these many protocols that the Internet Engineering Task Force (IETF) has standardized several can be described as tunneling protocols.

Tunneling protocols are used widely for various purposes. These purposes are all related to either information hiding, adding needed functionality, or improving current functionality. Usually, but not always, the tunnel uses unicast addresses, and so the tunnel is usually setup between two nodes. When multi-cast, multi-unicast or broadcast addressing is used, it allows the tunnel to be set up between multiple devices. However, even then, some tunneling mechanism is required to coordinate the group of nodes to participate in the tunnel.

Tunneling is a technology that enables one network to send its data via another network's connections. Tunneling works by encapsulating one protocol within packets carried by the second network. For example, Microsoft's PPTP technology enables organizations to set up tunnels across the Internet and other Internet Protocol (IP) based networks. As with all tunneling protocols, this tunneling is performed, in essence, by encapsulating the native protocol of the user's network with a PPTP envelope as well as an IP envelope. The IP envelope forms the tunnel between the two PPTP servers, and the PPTP envelope is used for controlling the tunnel.

Another protocol that the Internet Engineering Task Force (IETF) has standardized is the Point to Point Protocol (PPP). It is used to allow Internet Protocol (IP) and other protocols (such as IPX, XNS, AppleTalk, etc.) to be sent over non-IP mediums such as the Public Switched Telephone Network (PSTN), ATM, Frame Relay, SONET, etc. Point-to-Point Protocol (PPP) is designed to allow two nodes running like protocols (i.e. IP, IPX, XNS, AppleTalk, etc.) to communicate over a network that has a dissimilar functionality. So in essence Point-to-Point Protocol (PPP) can be thought of as a tunneling protocol.

Much of the modem day Internet is based on the paradigm of end users calling from a home/business computer to an Internet Service Provider (ISP). This paradigm then has the end users calling from their personal computer over the Public Switched Telephone Network (PSTN), Asymmetric Digital Subscriber Line (ADSL), etc to an Internet Service Provider (ISP). So both the physical and protocol layers that are below Point-to-Point Protocol (PPP) are terminated at both the end-users's communication equipment and the Internet Service Provider (ISP)'s Network Access Server (NAS) communications equipment.

For example, Internet calls between an end user at home to an Internet Service Provider (ISP) would normally be established over the Public Switched Telephone Network (PSTN) with the telephone call being between the end user's MODEM and the ISP's Network Access Server (NAS). The Point-to-Point Protocol (PPP) session would then be established from the end user's home computer to the ISP's Network Access Server (NAS). The NAS would then typically terminate both the Public Switched Telephone Network (PSTN) and the Point-to-Point Protocol (PPP) session. So on one side of the Network Access Server (NAS) is the Public Switched Telephone Network (PSTN) and Point-to-Point Protocol (PPP) input/output (I/O), while on the other side the NAS's I/O is Internet Protocol (IP). Those skilled in the art will recognize that a NAS is a gateway between the Public Switched Telephone Network (PSTN) and the Internet. Further, those skilled in the art will realize that a Network Access Server (NAS) may be any gateway device, such as Digital Subscriber Line Access Multiplexer (DSLAM), that interconnects two dissimilar networks such as IP, IPX, XNS, PSTN, ISDN, SS7, AIN, Cable Modems, etc.

The Network Access Server (NAS) then is usually responsible for terminating the Public Switched Telephone Network (PSTN) call as well as the Point-to-Point Protocol (PPP) session, extracting the Internet Protocol (IP) packets from the Point-to-Point Protocol (PPP) Protocol Data Units (PDUs), and usually assigning a temporary Internet Protocol (IP) address to the end user's Internet Protocol (IP) session. Further, the Network Access Server (NAS) performs Authentication, Authorization and Accounting (AAA) functions for the Internet Service Provider (ISP). These AAA functions are used for ensuring a secure Internet access offering is provided where the Internet Service Provider (ISP) can accurately bill the user for services rendered, and to ensure that unauthorized users are not allowed to use the service.

The traditional paradigm of having a Network Access Server (NAS) controlled and dedicated to the use of a single Internet Service Provider (ISP) has been changing in recent years. In its place is a new class of virtual dial-up applications, which allow multiple protocols, unregistered Internet Protocol (IP) addresses, and foreign Internet Protocol (IP) addresses to be used by the end user's computer. Because of the routing and packet forwarding conflicts caused by these new virtual dial-up applications, a tunneling protocol was needed to allow the physical and protocol layers below Point-to-Point Protocol (PPP) to be terminated by the Network Access Server (NAS), and then the Point-to-Point Protocol (PPP) Protocol Data Units (PDUs) themselves to be tunneled to another remote device. So in essence, the Network Access Server (NAS) function has been separated into two devices. One device handles the termination of the physical and logical layers below Point-to-Point Protocol (PPP), and then a second device terminates the Point-to-Point Protocol (PPP) stream itself.

The Internet Engineering Task Force (IETF) developed the L2TP (Layer Two Tunneling Protocol) to allow the Point-to-Point Protocol (PPP) to be tunneled over the Internet and so allowing the separation of Network Access Server (NAS) functions. L2TP comprises two main devices; namely, the L2TP Access Concentrator (LAC) and the L2TP Network Server (LNS). The LAC is co-located with the NAS and forwards a PPP stream to the LNS where the PPP stream is terminated.

The L2TP Access Concentrator (LAC) is a device attached to a switched network fabric (such as, for example, PSTN or ISDN) or co-located with a PPP end system capable of handling the L2TP protocol, while the L2TP Network Server (LNS) operates on any platform capable of PPP termination. In other words, the LAC provides the user side of the L2TP protocol, while LNS handles the server side. The LAC is the initiator of incoming L2TP calls (calls initiated from a General Switched Telephone Network (GSTN) edge device), and the LNS is the initiator of outgoing L2TP calls (calls initiated for a PSTN edge device). The LAC and the LNS then allow Point-to-Point Protocol (PPP) calls to be tunneled through the NAS and the Internet. This then allows the PPP session to be established between an end user and the LNS. The Network Access Server (NAS) is a device providing temporary, on-demand network access to users. The PPP communication session is typically point-to-point, with the NAS interconnected to the end-user via the PSTN.

The LAC must connect to the full range of networks that it wishes to accept callers from; for example, PSTN, ISDN, ADSL, etc. However, the LNS has no such requirement. Instead, the LNS's main connectivity requirement (in order to allow intercommunications with the LAC) is to have network layer connectivity to the LACs that it wishes to communicate with.

A further change to the traditional Network Access Server (NAS) paradigm is that Incumbent Local Exchange Carriers (ILECs) and Competitive Local Exchange Carriers (CLECs) are beginning to offer Network Access Server (NAS) services, where Internet Service Providers (ISPs) and businesses can purchase either virtual or physical Network Access Server (NAS) resources. Then the Incumbent Local Exchange Carrier (ILEC)/Competitive Local Exchange Carrier (CLEC) Network Access Servers (NASs) tunnel the multiple Point-to-Point Protocol (PPP) calls to their intended destination with the use of L2TP. This allows the physical and logical layers below Point-to-Point Protocol (PPP) to be terminated by the ILEC/CLEC Network Access Server (NAS) service and the Service Providers (SPs) to terminate the Point-to-Point Protocol (PPP) sessions. Because of both business and regulatory reasons, these new ILEC/CLEC Network Access Server (NAS) hosting services will be significantly expanding. Those skilled in the art will recognize that a Service Provider (SP) may be an Internet Service Provider (ISP), business needing dial-in access, or any other entity requiring dial in services but lacking the requirement to host a Network Access Server (NAS) themselves. Also, those skilled in the art will recognize that not only ILECs or CLECs may provide this Network Access Server (NAS) hosting service, but also Inter-eXchange Carriers (IXCs), Internet Service Providers (ISPs), or any type of carrier may offer the service.

The Network Access Server (NAS) hosting service will probably need to be located at each Central Office (CO), and so L2TP tunnels must be set up between every central offices's NAS L2TP Access Server (LAC) and their respective L2TP Network Server (LNS) Point-to-Point Protocol (PPP) termination point. Those skilled in the art will readily see that this creates a large manageability problem. For example, if 100 service subscribers subscribe to this hosting service and each has two LAC/LNSs, for redundancy purposes, then there would be 200 possible LNSs that each NAS/LAC must be configured for which to also establish subsequent L2TP tunnels. Further, if 1000 central offices have a hosting service, then 20,000 L2TP tunnels must be configured and maintained. This obviously, is a major problem with providing the service.

The problem then with the use of tunneling protocols is that they are designed for either point to point or some other defined group use. This means that no merging of the thousands of tunnels is possible and that a large service such as a Incumbent Local Exchange Carrier (ILEC) or Competitive Local Exchange Carrier (CLEC) Network Access Server (NAS) hosting service will not scale to a large amount of NASs/LACs and L2TP Network Server (LNS) termination points. Further, managing the large number of tunnels individually would add significant operational cost and complexity.

In the traditional case, the L2TP LAC would be located at the ILEC/CLEC NAS hosting service and then the L2TP LNS would be located at either the ISP or the business subscribing to the NAS hosting service. Those skilled in the art will realize that while it is more likely to have the LAC with the NAS, it is possible to have the LNS located at the NAS as well. Further, those skilled in the art will realize that while the Internet will commonly be used to transport the L2TP sessions, it is also likely that other networks such as Intranets, Public Data Networks (PDNs), and even non-IP networks could be used in its place. Those skilled in the art will realize that the L2TP tunneling protocol could be substituted with other tunneling protocols such as IP/IP (RFC 1853), GRE (RFC 1702), MPLS, IPSEC, proprietary tunneling implementations, etc. Those skilled in the art will also realize that not just IETF standards could-be used for the tunneling protocols. Any tunneling protocol from the plethora of other standard bodies and organizations such as the ITU, ADSL Forum, ATM Forum, etc., could be used instead.

Those skilled in the art will realize that the description of IP network based tunneling is done for illustrative purposes. Other non-IP tunneling mechanisms would have the same problems. For example, if X.25 was tunneled over a Frame Relay PDN, then the same scaling problem could be experienced. So this same problem would exist in non-IP based networks such as IPX, Frame Relay, ATM, X.25, etc.

SUMMARY OF THE INVENTION

It is therefore an object of the present invention to provide a method and apparatus for managing a tunnel protocol so as to allow merging of tunnels between service providers and hosts making it possible to achieve a high degree of scalability.

In accordance with the preferred embodiments of the present invention, some of the problems associated with providing a large service based on traditional tunneling protocols such as L2TP are overcome. A method and system for creating a tunneling service from the use of a traditional tunneling protocol (such as L2TP) is described. In particular, L2TP's original design intention of going point to point between a LAC and LNS is abstracted so that L2TP does not go between a final source and final destination. Instead, a new L2TP tunnel merging and management service (LTM service) is created. Then L2TP becomes an access protocol to the new LTM service. To an LAC, the LTM service appears as an LNS, to an LNS the LTM service appears as an LAC. Therefore, no change to the L2TP tunneling protocol is needed to allow a LTM service to be inserted between the actual L2TP LAC and LNS.

The L2TP tunneling then is extended to include an L2TP Tunnel Standard Access Protocol (TSA protocol) that is the L2TP protocol being standardized by the IETF, and secondly a L2TP Internal Network Trunk Protocol (INT protocol) that is used to provide the required additional functionality for the LTM service. The TSA protocol then allows standard tunneling products using standard tunneling protocols to connect to a non-standard LTM service and with the use of the non-standard INT protocol have non-standard functionality transparently added to the TSA protocol.

Tunnels based on the TSA protocol are referred to as Access Tunnels as they are used to access the LTM service. Tunnels based on the INT protocol are refereed to as Trunk Tunnels as they are hidden from the actual LAC/LNS devices and serve to connect the internal LTM devices that serve to provide the coordinated LTM service. A real LAC/LNS on one end, and a LTM device on the other end always terminate Access Tunnels. LTM devices on either end always terminate Trunk Tunnels. The LTM service edge nodes then masquerades as a LAC to real LNSs, and masquerades as a LNS to real LACs. The LTM service then appears to terminate all L2TP tunnels (based on the TSA protocol) and switches the L2TP calls, inside of the internal LTM trunk tunnels (based on the INT protocol) to the proper L2TP tunnel (based on the TSA protocol). Using this technique, significant advantages such as L2TP tunnel merging and centralized tunnel coordination services are realized.

The LTM service allows packet routing functions to be performed in a non-traditional manner where L2TP information is used to route the IP packets instead of using the traditional IP destination address. This is possible because the LTM service coordinates and distributes L2TP information between the LTM service devices. This knowledge of the available L2TP LAC/LNSs located around the network then allows each edge device of the LTM service to classify and forward IP packets not on IP destination addresses contained in the packet, but to classify and forward them according to the information contained in the L2TP packet layer.

In a standard L2TP environment, if there were 400 LACs that must be interconnected to 50 LNSs, then 50 L2TP tunnels would be required at each LAC and 400 tunnels would be required at each LNS for a total of 20,000 tunnels. With the LTM service the number of access tunnels could be reduced as much as only having one tunnel for each LAC/LNS for a total of 450 TSA tunnels. However, the amount of tunnel reduction depends upon how much destination addressing is performed by the INT protocol and internal LTM service devices.

In one of the preferred embodiments of the invention, an LAC is co-located with each NAS in the central office and an LNS is co-located in the terminating service provider. Addressing for incoming calls (those originating from the LAC) is provided by the NAS itself, and communicated to the LTM service by the tunnel over which the L2TP call is established. In other words, no usable information is provided in the call origination message that the LTM service acts on to select the destination LNS but is intrinsically associated with the tunnel selected to host the call. This type of addressing is called Incoming Call Tunnel Addressing (ICT Addressing). Addressing for outgoing calls (those originating from the LNS) have the destination subscriber number contained in the call origination message. This subscriber number is used by the LTM service to select the destination LAC required to reach the destination subscriber. This type of addressing is called Outgoing Call Tunnel Addressing (OCT Addressing).

In the before mentioned preferred embodiment of the invention, LACs use ICT Addressing to communicate service provider (SP) destination information to the LTM service. This causes a requirement that each LAC have one tunnel established for each SP that it wishes to tunnel PPP sessions to. Using ICT addressing, tunnel reduction on the LAC is only achieved if there are multiple LNSs per service provider. This is because when using ICT addressing, there is one tunnel setup for each service provider (SP), not for each LNS.

Likewise, in the before mentioned preferred embodiment of the invention, LNSs use Outgoing Call Tunnel Addressing (OCT) to communicate destination subscriber information to the LTM service. Because the complete destination address is sent with each outgoing call request, no tunnel based addressing is needed. This then allows the LNS to only require one tunnel between it and the LTM service. However, unlike tunnel based addressing, the LTM service must take the OCT addressing and select a LAC that is capable of reaching the destination subscriber. In addition, this OCT addressing only specifies the destination subscriber and not the actual LAC/NAS that can be used to serve as a gateway between the LTM network and the non-IP based network that interconnects the NAS to the destination subscriber. Therefore, the LTM service itself must determine the proper LAC/NAS to perform the out-dialing function.

Using the previous example of 400 LACs interconnected with 50 LNSs, and assuming that these 50 LNSs were evenly divided between 5 service providers for a total of 10 LNSs in each service provider, then the use of ICT and OCT addressing would require only 2050 TSA tunnels to be established. In other words, each of the 400 LACs would have 5 TSA tunnels to address the 5 separate services providers (SPs) and each of the 50 LNSs would have 1 TSA tunnel between it and the LTM device.

The selection function used by the LTM service to locate the outgoing LAC/NAS is dependent on the outgoing non-IP based network that the destination subscriber is attached to. For instance, if the destination subscriber is attached to the PSTN or ISDN, then the LTM service will attempt to locate an outgoing LAC/NAS that can reach the destination subscriber with the lowest cost. While it would be best to find a LAC/NAS that is in the same CO or at least a LAC/NAS that is in the same local area as the destination subscriber, other higher priced long-distance options, while undesirable, are technically possible. However, if the subscriber is attached to an ADSL network, then the LTM service must find the LAC/DSLAM that provides the interconnection service for the destination subscriber. So unlike the PSTN/ISDN case, when performing an outgoing ADSL call, there is no option of using a LAC/DLSAM that could provide the service at a higher cost.

The placing of a LTM service between the actual L2TP LAC and LNS allows not only the goal of tunnel reduction to be realized, but this centralized tunneling network infrastructure allows additional internal LTM services to be developed and deployed. For example, as described previously, the mechanism for performing out-dialed calls can be built directly into the LTM service. Other benefits of the centralized LTM service include: added redundancy, a common LTM service that lowers management complexity and operational costs, allow carrier class centralized management of the tunneling infrastructure, allow routing on the L2TP layer information instead of IP destination address, provide a centralized LTM service where centralized authentication, authorization and accounting is more easily implemented and more assured of being hacker resistant. Finally, an LTM service allows the ILEC/CLEC NAS provider to coordinate the tunneling service to allow planned outages, and other required services for 24×7 offerings. These and other benefits will become more apparent as the invention is described.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

The present invention takes a tunneling protocol that was intended for point-to-point operation and abstracts that protocol so that the point-to-point protocol now becomes an access protocol to a tunneling service, the L2TP Tunneling Merging and Management (LTM) service. As will become clear from the following description, this abstraction provides significant gains in functionality.

Figure 1:
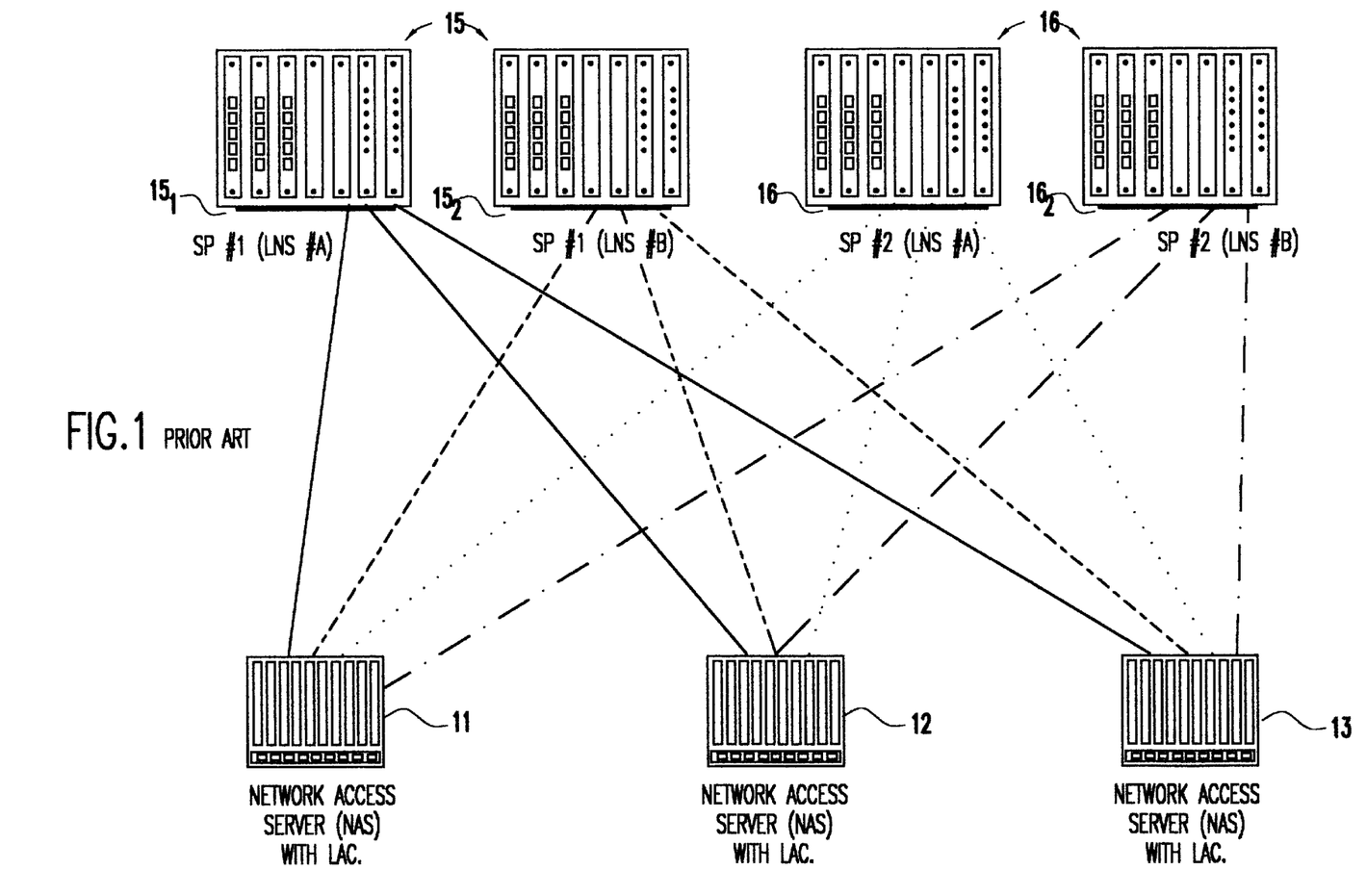
FIG. 1 is block diagram showing a traditional usage of a L2TP connecting three L2TP access controllers (LACs) and four L2TP network servers (LNSs)

To better illustrate the gains in functionality afforded by the invention, reference is now made to FIG. 1 of the drawings which shows a traditional L2TP tunneling service. In this example, the LACs of three Network Access Servers (NAS) 11, 12 and 13 are respectively directly connected two Service Providers (SPs) 15 and 16, each with two L2TP Network Servers (LNSs) $15_1$, $15_2$ and $16_1$, $16_2$. As can be seen, each time that an LNS is added to an established SP 15 or 16, all LACs must be reconfigured to support the new LNS. Further, as can be seen, the only method of having a coordinated tunneling service using direct connected L2TP tunnels (indicated by the solid, dashed, dotted, and dash/dot lines) is to add this service functionality to each LAC and LNS. As those versed in the art will recognize, doing service functionality between multiple disparate vendors' equipment must have a standard or inter-operability agreement that they all follow. However, considering the difficulty and slowness in standardizing services, it would be time prohibitive and have substantial risk of failure.

Figure 2:
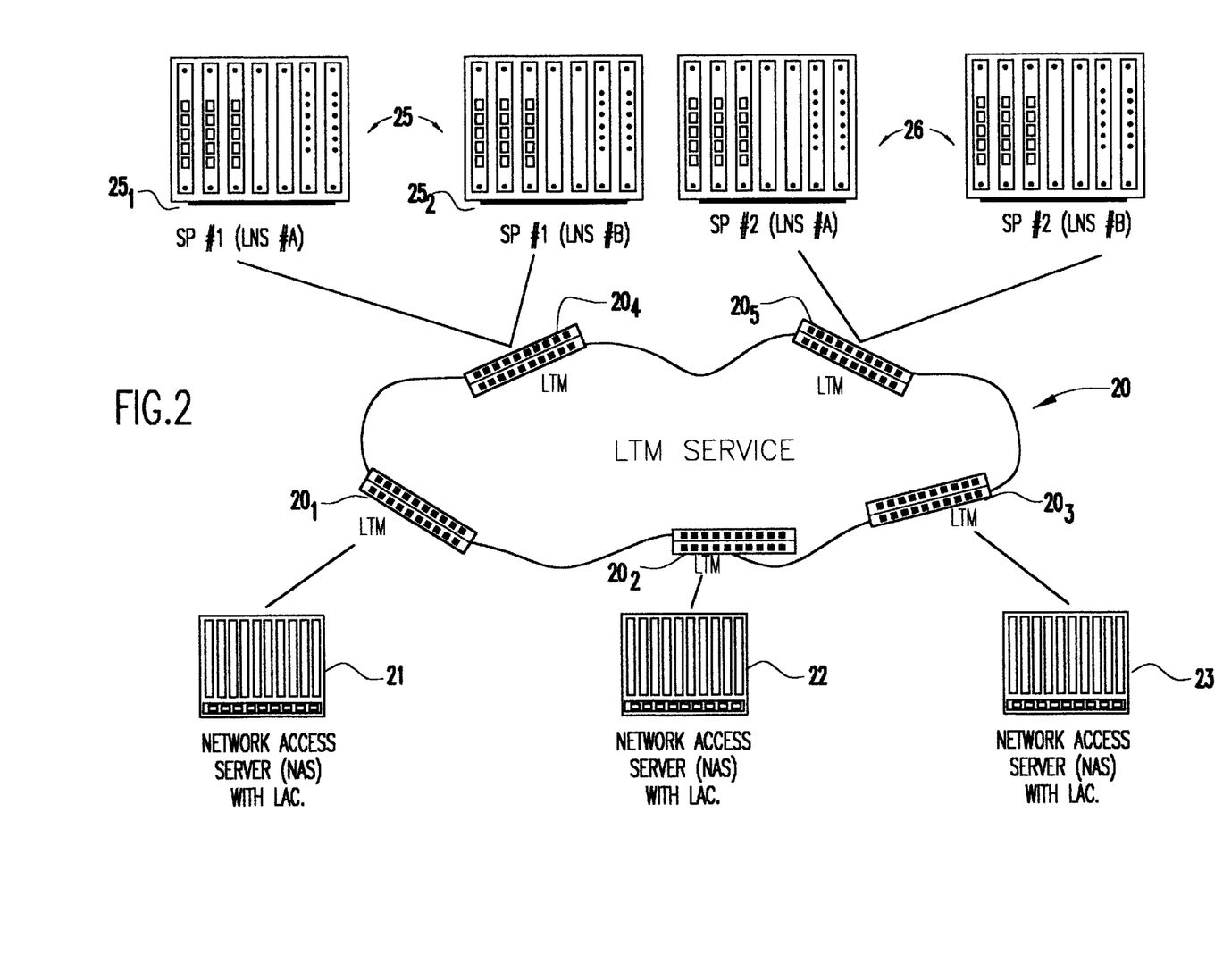
FIG. 2 is a block diagram according to the present invention having a L2TP tunnel merging (LTM) service inserted between the LACs and LNSs.

FIG. 2, shows the L2TP Tunnel Merging and Management (LTM) service 20 inserted between the L2TP Access Concentrators (LACs) of the Network Access Servers (NASs) 21, 22 and 23 and the L2TP Network Servers (LNSs) of the Service Providers (SPs) 25 and 26, and shows the lowering of both overall tunnels and the tunnels supported by each of the individual LACs and LNSs. As those versed in the art will recognize, L2TP now becomes an access protocol into the L2TP Tunnel Merging and Management (LTM) service 20. In addition, as those versed in the art will recognize the LTM devices $20_1$, $20_2$, $20_3$, $20_4$, and $20_5$ which implement the LTM service could all be provided by a single equipment manufacturer. This then would allow an LTM service 20 to evolve that could then be eventually standardized. Many services have followed this traditional evolution.

The method and apparatus of putting new services in the L2TP tunnel merging and management (LTM) service 20 beyond those currently existing in the standardized tunneling protocol such as L2TP will now be explained, for example, coordinated rerouting of new L2TP tunnels around L2TP tunnel merging and management (LTM) or access L2TP tunnel devices that are being scheduled for maintenance, etc.

Referring still to FIG. 2, all the L2TP Access Concentrators (LACs) and L2TP Network Servers (LNSs) are attached directly to the L2TP Tunnel Merging and Management (LTM) service 20 and never directly to each other. The LTM service 20 then has the ability to insert added functionality into the L2TP access messages that it transports in a service wide manner. An example of this is, if L2TP Network Server (LNS) $25_2$ of service provider (SP) 25 has been scheduled for preventive maintenance, then the LTM service 20 would stop setting up new calls to LNS $25_2$ of SP 25, and would only setup calls to LNS $25_1$ of SP 25. Then when no calls are present on LNS $25_2$, it could be removed from service and maintenance performed on it.

Another example, of the benefit of adding a coordinated LTM service 20 is that rerouting of internal LTM tunnels could be performed when internal LTM service failures occur. As those skilled in the art will recognize, a point-to-point tunnel protocol such as L2TP does not usually have redundancy built into the protocol. So if a local tunnel device on one end of the tunnel determines that the underlying communication facilities have failed, or the remote tunnel device has failed then the local termination device will terminate the tunnel and all access calls inside of it. However, with the LTM service 20 between the two tunnels access devices (LAC/LNS), if the failure occurs inside of the LTM service 20 then, the LTM service 20 can reroute the internal LTM tunnel trunks to repair any failures. However, if the failure occurs outside of the LTM service 20 or on the edge devices $20_1$, $20_2$, $20_3$, $20_4$, and $20_5$, then no repair is possible if the tunneling protocol does not support it.

Figure 3:
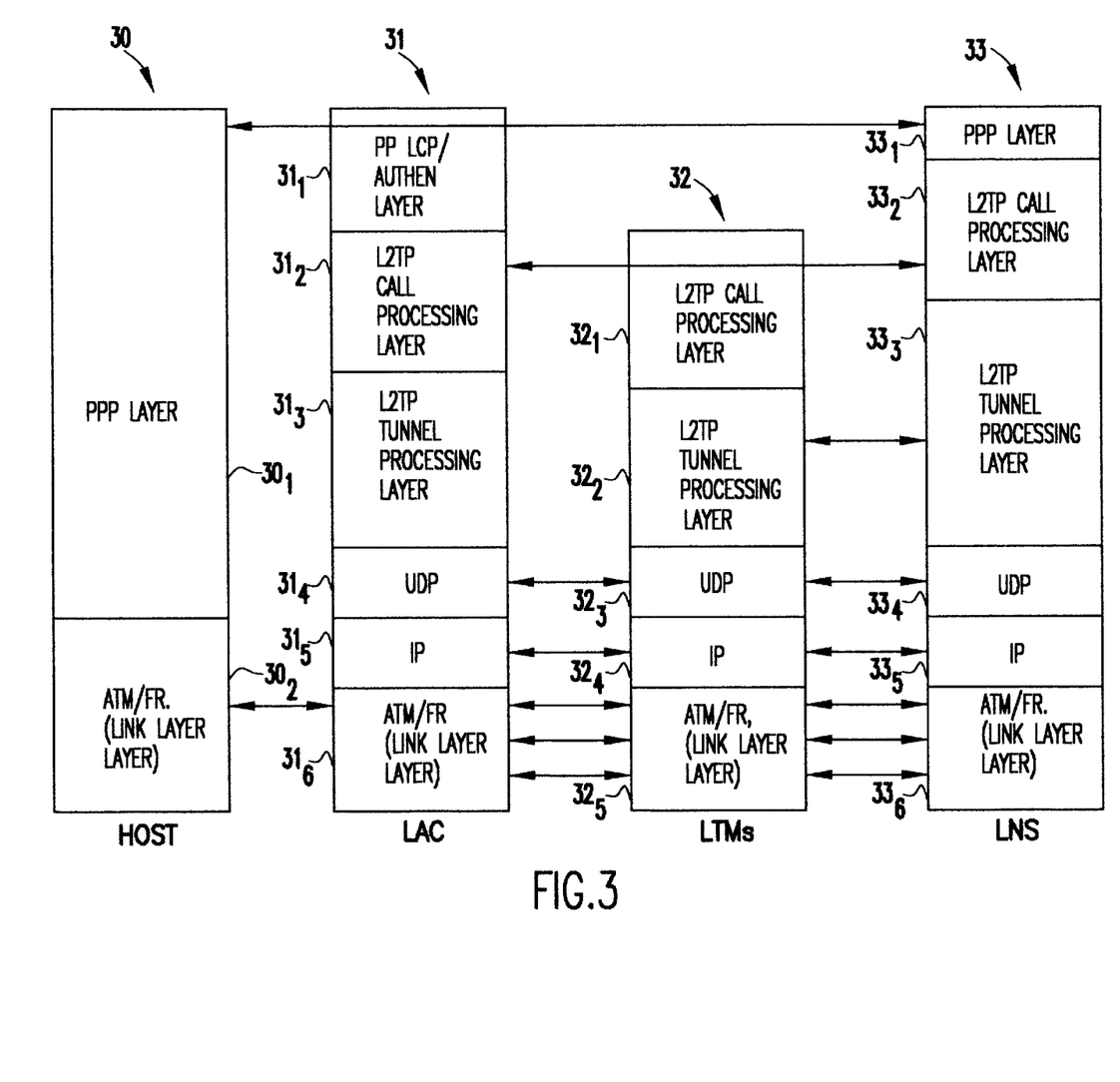
FIG. 3 is a block diagram illustrating L2TP layering and protocol relationships.

FIG. 3, shows the general protocol layering of L2TP on a Point-to-Point Protocol (PPP) Host 30, L2TP Access Concentrator (LAC) 31, L2TP Tunnel Merging and Management (LTM) devices 32, and L2TP Network Server (LNS) device 33. Those skilled in the art will see that this is not an exact layering of all possible protocols, but a layering of high-level protocol functionality. For example, it is permissible to not have Internet Protocol (IP) and User Datagram Protocol (UDP) inserted between the L2TP layer and the FR (Frame Relay)/ATM (Asynchronous Transfer Mode) layers. In addition, those skilled in the art will recognize that other link layer protocols could be substituted for ATM and FR. For example, various modem protocols such as V.42 and V.42bis could have been used if the communication medium was the Public Switched Telephone Network (PSTN).

FIG. 3 more particularly shows the interaction between protocol functional layers in different devices. The devices shown include the Host 30, the LAC 31, LTMs 32, and the LNS 33. The Host 30 includes, PPP layer $30_1$ and ATM/FR layer $30_2$. The LAC includes a PPP LCP/Authentication layer $31_1$, an L2TP Call Processing Layer $31_2$, an L2TP Tunnel Processing Layer $31_3$, a UDP layer $31_4$, an IP layer $31_5$, and an ATM/FR layer $31_6$. The LTMs 32 include an L2TP call processing layer $32_1$, an L2TP tunnel processing layer $32_2$, a UDP layer $32_3$, an IP layer $32_4$, and an ATM/FR layer $32_5$. The LNS 33 includes a PPP layer $33_1$, an L2TP call processing layer $33_2$, an L2TP tunnel processing layer $33_3$, a UDP layer $33_4$, an IP layer $33_5$, and an ATM/FR layer $33_6$.

As can be seen, the Point-to-Point Protocol (PPP) layer $33_1$ is terminated in the L2TP Network Server (LNS) 33 and the Point-to-Point Protocol (PPP) layer $30_1$ in the Host 30. Those skilled in the art will realize that when making incoming calls, the L2TP Access Concentrator (LAC) 31 may temporarily establish a Point-to-Point Protocol (PPP) LCP and Point-to-Point Protocol (PPP) authentication session with the Point-to-Point Protocol (PPP) layer $30_1$ of the Host 30 for purposes such as to determine which L2TP Network Server (LNS) 33 that the Point-to-Point Protocol (PPP) Host wishes to communicate with or to select the proper TSA tunnel and service provider (SP) using ICT addressing. The L2TP Access Concentrator (LAC) 31 may then add functionality, but the L2TP Access Concentrator (LAC) 31 is not considered as the final termination point when the Point-to-Point Protocol (PPP) session is fully established.

Likewise, FIG. 3 shows the interaction of the L2TP call processing layer $32_1$ of the LTMs 32 between the L2TP Access Concentrator (LAC) 31 and the L2TP Network Server (LNS) 33. As in the case of the PPP LCP/ Authentication layer $31_1$, the L2TP call processing layer $32_1$ temporarily terminates the protocol stream while the call is being established. After the call is established, then the protocol stream may be transported transparently. Not shown in this figure, is the fact that multiple L2TP Tunnel Merging and Management (LTM) devices 32 could be between the L2TP Access Concentrator (LAC) 31 and L2TP Network Server (LNS) 33. However, as shown in the figure, the L2TP incoming access call processing first is between an ingress L2TP Tunnel Merging and Management (LTM) service, then next is routed via the LTM service, and then finally is initiated between the egress LTM service and the L2TP Network Server (LNS). Similarly for outgoing calls, the L2TP outgoing access processing starts between the L2TP Network Server (LNS) and ingress L2TP Tunnel Merging and Management (LTM) service, next is routed via the LTM service, and finally is initiated between the egress LTM service and the L2TP Access Concentrator (LAC). In both incoming and outgoing calls, the edge LTM appears to the LAC/LNS to terminate the L2TP call as well as L2TP payloads when they begin to flow for the call. So the L2TP Tunnel Merging and Management (LTM) service adds functionality and appears to the LAC/LNS to terminate the call but, in actuality, the call is hosted between the L2TP Access Concentrator (LAC) and L2TP Network Server (LNS)

Finally, FIG. 3 shows that L2TP Tunnel processing, User Datagram Protocol (UDP), Internet Protocol (IP), and link layer processing such as ATM/Frame Relay is terminated between all adjacent nodes. So with the exception of the Point-to-Point Protocol (PPP) layer and the L2TP access/ trunk call processing layer, all processing is terminated by their respective adjacent nodes. Further, Point-to-Point Protocol (PPP) and the L2TP call layers are terminated initially by the L2TP Access Concentrator (LAC) and L2TP tunnel merging and management (LTM) service, respectively. Those skilled in the art will realize that except for the Point-to-Point Protocol (PPP), the LTM then performs a hard partition between the LACs and LNSs. While the only exception to this is that L2TP call processing and L2TP payloads may be transported transparently, it must be noted that the L2TP tunnel merging and management (LTM) can add functionality when needed, such as at the start of call processing.

The separation that the L2TP tunnel merging and management (LTM) service provides between the L2TP Access Concentrator (LAC) and L2TP Network Servers (LNSs) is used by the LTM service to assist in lowering the effect of configuration changes. For instance, as is shown in FIG. 2, if an additional L2TP Network Server (LNS) is added to either one of service providers (SPs) 25 or 26, then no additional configuration is needed in any of the LACs of the NASs 21, 22 or 23, because only the LTM service 20 needs to be reconfigured for the additional LNS. Likewise, if an additional LAC is added for a fourth NAS, then no additional reconfiguration is needed to any of the LNSs of the SPs 25 and 26, because only the LTM service 20 needs to be configured for the additional LAC.

As shown in FIG. 3, all protocols with the exception of Point-to-Point Protocol (PPP) are terminated or terminated and passed by the L2TP Tunnel Merging and Management (LTM) service 32. This creates a need for an internal trunk protocol (INT protocol) that is only used between LTMs and communicates two sets of information. The first set is information needed to coordinate the establishment of access L2TP calls and tunnels on opposite side of the LTM service. The second set is information that is used to coordinate the LTM service, such as bandwidth availability, other resource availability, LAC/LNS status, etc.

Figure 4:
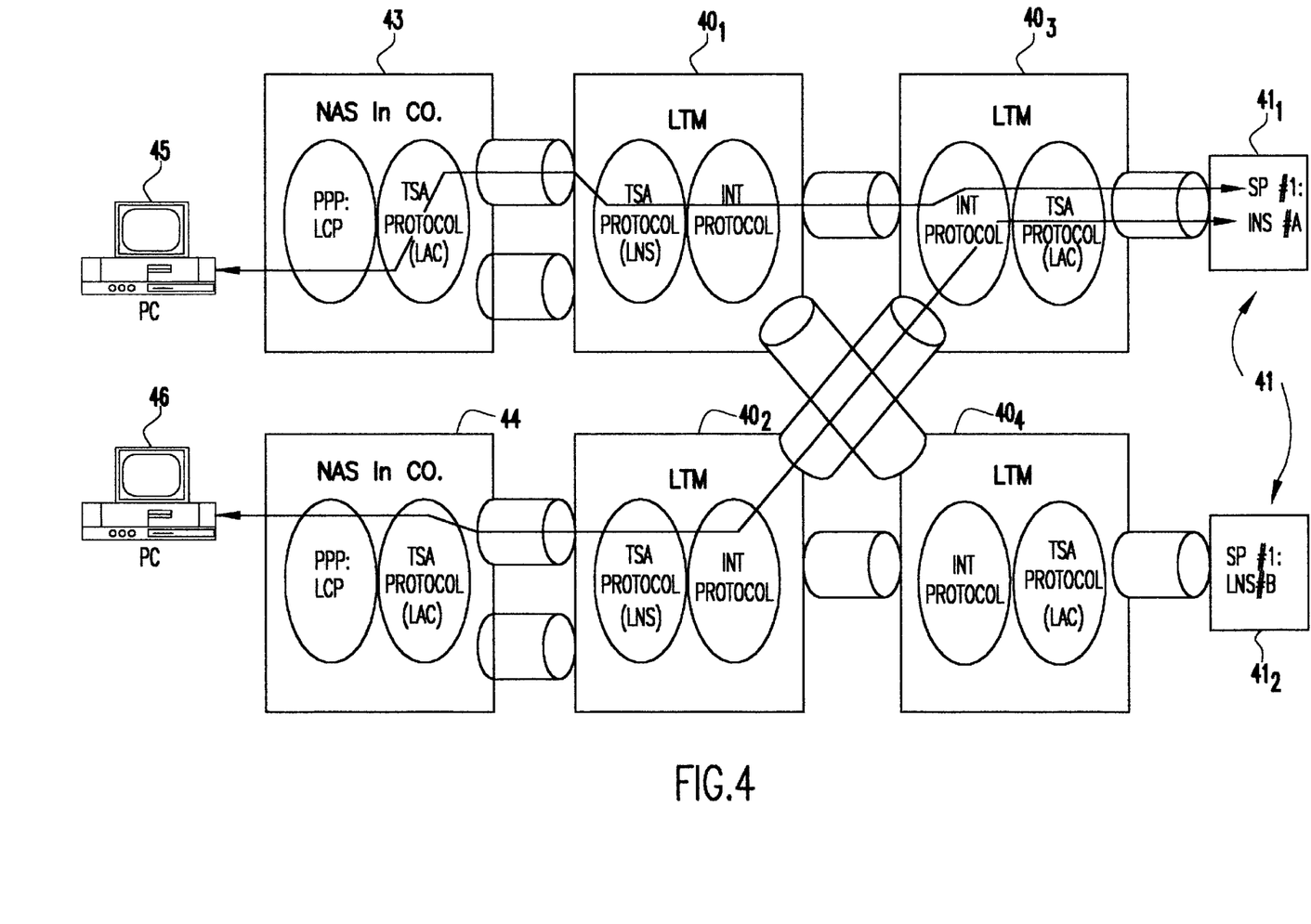
FIG. 4 is a block diagram showing an example of the LTM according to the present invention.

Since the INT protocol is distributing detailed resource information, such as bandwidth and LAC/LTM availability, the LTM devices can then use this to determine where to establish new calls. This is shown in FIG. 4, where LTMs $40_1$, $40_2$, $40_3$, and $40_4$ interconnect LNSs $41_1$ and $41_2$ of Service Provider 41 with LACs of Network Access Servers (NASs) 43 and 44. The NASs 43 and 44 provide connections, for example, to Personal Computers (PCS) 45 and 46, respectively. In FIG. 4, the LTMs $40_1$, $40_2$, $40_3$, and $40_4$ are directing new calls only to the LNS $41_1$ of SP 41 (assuming that LNS $41_2$ has much more resources currently in use). The Internal Trunk (INT) protocol also uses the distributed information to determine when new Access/ Trunk tunnels need to be established, or if they are no longer needed and can be torn down. Likewise, this same distributed information will be used to determine if more multi-VCs inside of a single tunnel should established, or if they are no longer needed.

As shown in FIG. 4, LNSs $41_1$ and $41_2$ and LACs of NASs 43 and 44 interface to LTMs $40_1$, $40_2$, $40_3$, and $40_4$ via the Tunnel Standard Access (TSA) protocol. However, the LTMs $40_1$, $40_2$, $40_3$, and $40_4$ will convert their operation depending on the type of device they are communicating with. This is important because without the LTMs simulating an LAC to an LNS and an LNS to an LAC, respectively, then the isolation and functional enhancement that the LTM service provides would not be possible. Likewise, the LTMs $40_1$, $40_2$, $40_3$, and $40_4$ when connected directly to another internal LTM device will use the INT protocol. Therefore, the LTM devices $40_1$, $40_2$, $40_3$, and $40_4$ will convert their functional actions in three different ways depending on the device that they are interfacing with.

As shown in FIG. 3, all layers of protocol functionality are terminated (at least initially) at the LTM edge device 32 with the exception of Point-to-Point Protocol (PPP). FIG. 4 further shows that the LTM service routes individual L2TP access payloads between different access tunnels. However, as one skilled in the art will recognize, the termination of Internet Protocol (IP) at the edge of the L2TP tunnel merging and management (LTM) service means that Internet Protocol (IP) cannot be used to route the payload. Instead, the LTM distributed service information will be used to provide this function. Therefore, the routing function of L2TP access payloads is performed on the L2TP tunnel information and not the normal network layer. The exact processing followed by the ingress and egress LTM devices for L2TP access payloads are shown in FIG. 5 and FIG. 6.

Figure 5:
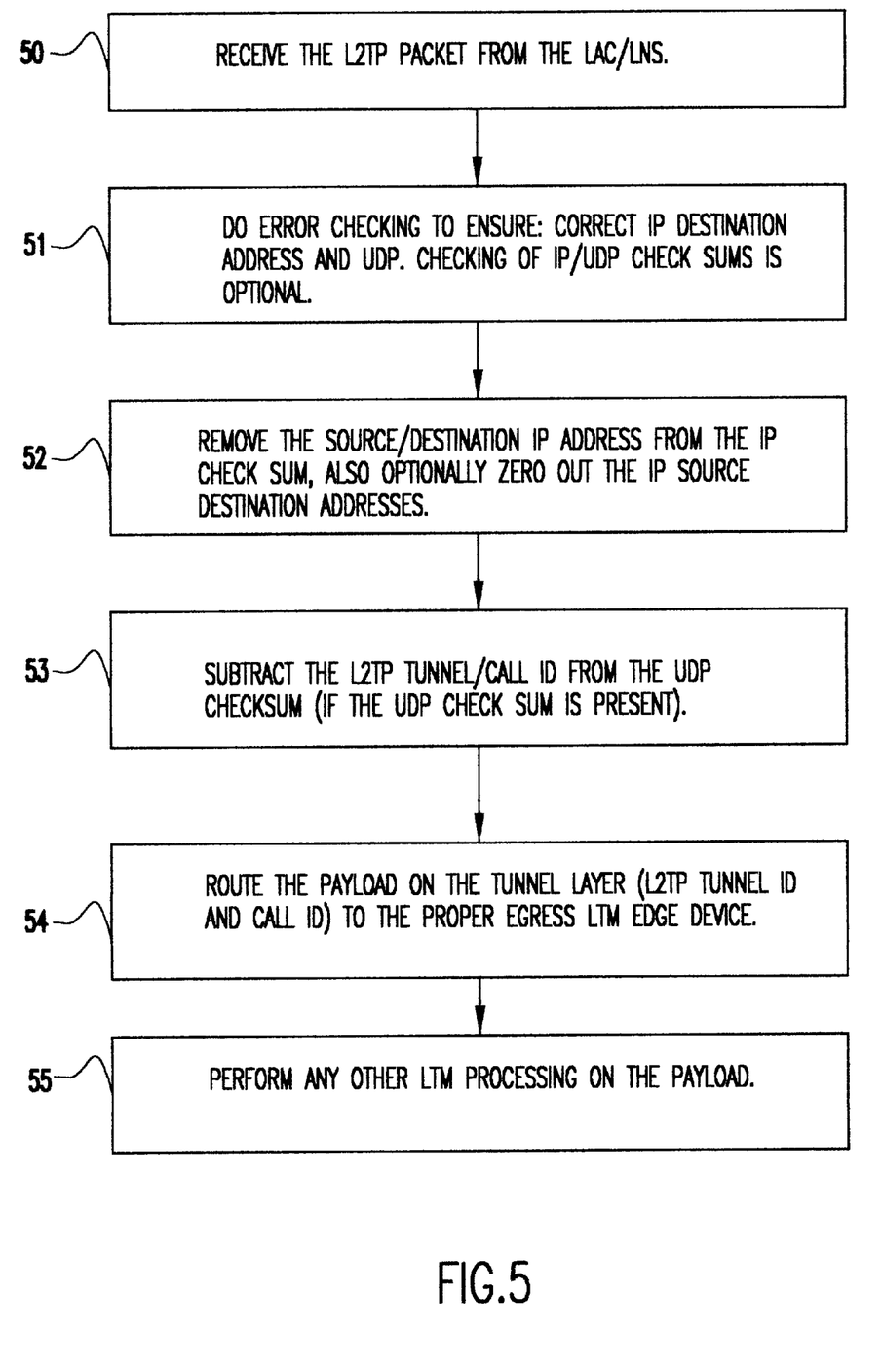
FIG. 5 is a flow diagram showing ingress processing of payloads on LTM edge devices.

Referring first to FIG. 5, there is shown a flow diagram for ingress processing of payloads on LTM edge devices. First, in block 50, the L2TP packet is received from the LAC/LNS. In block 51, an error check is performed to insure proper IP destination address and UDP. Checking of IP/UDP check sums is optional in this step. In block 52, the source/destination IP address is removed from the IP check sum and the IP source/destination address is zeroed out. If a UDP check sum is present, the L2TP tunnel and call ID is subtracted from the checksum in block 53. In block 54, the LTM routes the payload on the tunnel layer to the proper egress LTM edge device. Finally, in block 55, any other LTM processing is performed on the payload.

Figure 6:
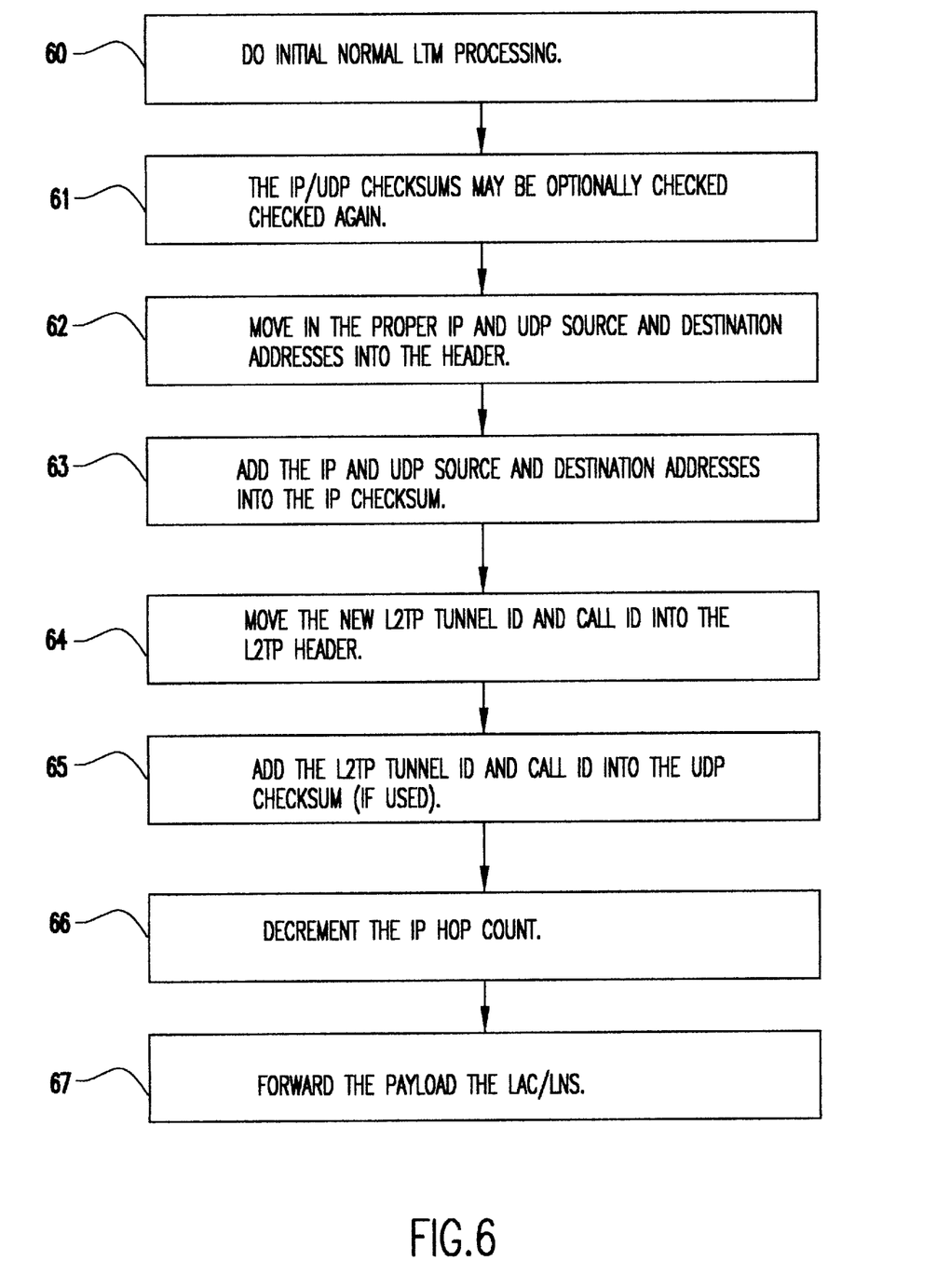
FIG. 6 is a flow diagram showing egress processing of payloads on LTM edge devices.

Referring next to FIG. 6, there is shown a flow diagram for egress processing of payloads on LTM edge devices. In block 60, the LTM edge device performs any initial processing needed on the received L2TP packet and, in block 61, the IP/UDP check sums may be optionally checked. In block 62, the proper IP and UDP source and destination addresses are moved into the header. In block 63, the IP and UDP source and destination addresses are added to the IP check sum. In block 64, the new L2TP tunnel ID and call ID are moved into the L2TP header. In block 65, the L2TP tunnel ID and call ID are added to the UDP checksum and, in block 66, the IP hop count is decremented. Finally, in block 67, the payload is forwarded to the LAC/LNS.

In a preferred embodiment of the invention, the use of traditional point-to-point tunneling addressing is abstracted to function with a L2TP Tunnel Merging and Management (LTM) service inserted between the LAC/LNS. Incoming call tunnel addressing (ICT) is where the L2TP Access Concentrator (LAC) communicates the service provider (SP) that it wishes to use, by the tunnel that it chooses to send the call over. To the LAC it appears that there is only one service provider (SP) LNS at the remote end of the tunnel. In actuality, the LTM service will decide, based on various constraints, which of the possible multiple service provider (SP) LNSs that the call will be setup on. The environment for Incoming Call Tunnel (ICT) addressing is shown in FIG. 7.

As those skilled in the art will recognize, when using ICT addressing the TSA tunnel must have been previously established so that both the LAC and LTM jointly understand which service provider (SP) is being addressed by a particular TSA tunnel. This may be done while the tunnel is being established via the use of a predetermined tunnel ID, or it may be a predetermined instructive Attribute-Value Pair (AVP) placed into one of the L2TP tunnel initiation messages. Also, it may be outside of the L2TP method that coordinates which L2TP tunnel is associated with which service provider (SP) after the TSA tunnel has been established. Whatever the method used though, those skilled in the art will see the importance of its coordination. Further, those skilled in the art will realize that ICT addressing is not dependent on what coordination method is used, but rather is intrinsically related to associating a particular service provider (SP) with a particular TSA tunnel via a predetermined method.

Figure 7:
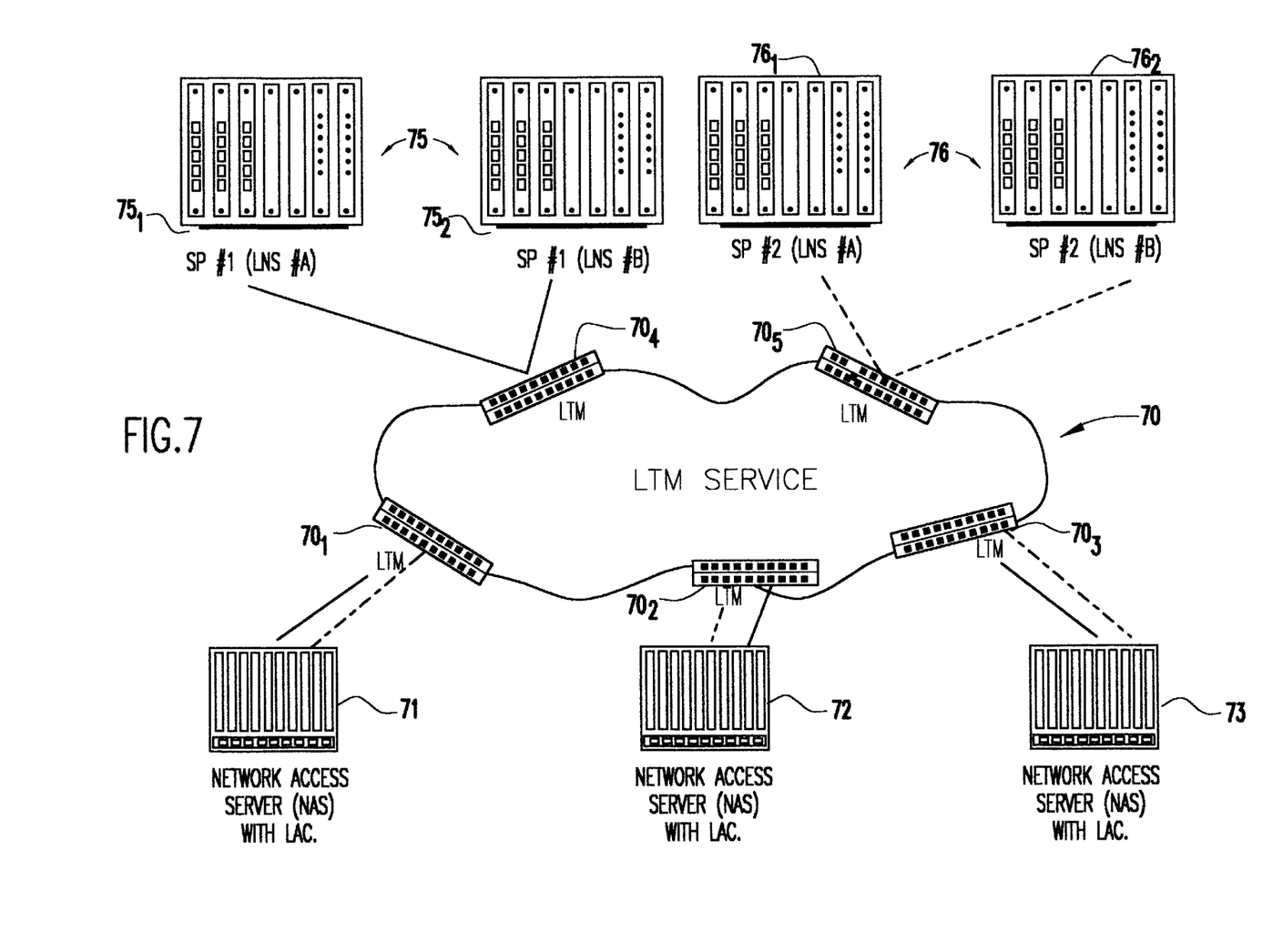
FIG. 7 is a block diagram showing the LTM service according to a second embodiment of the present invention using incoming call tunnel (ICT) addressing.

In FIG. 7, the solid lines represent tunnels destined to/from Service Provider (SP) 75, and the dashed lines represent tunnels destined to/from SP 76. LNSs $75_1$ and $75_2$ are directly connected to LTM edge device $70_4$ of LTM service 70, and LNSs $76_1$ and $76_2$ are directly connected to LTM edge device $70_5$. The LAC of NAS 71 has two connections to LTM edge device $70_1$, one for SP 75 and one for SP 76. Likewise, the LACs of NASs 72 and 73 have two connections respectively to LTM edge devices $70_2$ and $70_3$. A comparison with FIG. 1 will show the simplifications afforded at this level of the architecture.

Further, the selection of different processing depending on the type of communication fabric the destination subscriber is attached to. For example, if the destination subscriber is attached to the Public Switched Telephone Network (PSTN) then any LAC/NAS will be able to reach the subscriber, however, it is preferable to have a lowest cost LAC/NAS to be selected. In contrast, a LAC/Digital Subscriber Line Access Multiplexer (DSLAM) will require the use of certain L2TP Access Concentrator (LAC)s that have a connection to the Digital Subscriber Line Access Multiplexer (DSLAM)(s) that have access to the destination subscriber.

In another preferred embodiment of the invention, with outbound calls, the use of the traditional point-to-point outbound dialing is abstracted to function with a L2TP Tunnel Merging and Management (LTM) service inserted between an LAC and an LNS. In outbound calls, the LNS only conveys the final destination subscriber address and not the actual LAC to use. This is because in the point-to-point tunneling protocol such as L2TP, there is only one L2TP Access Concentrator (LAC) at the remote end of the tunnel. Therefore, the enhancement that the L2TP Tunnel Merging and Management (LTM) service provides is the selection of the actual L2TP Access Concentrator (LAC) to use to perform the outbound call. This selection process will be done with the aid of an internal database that is internal to the LTM service. This internal database contains the complete list of LACs (associated with the LTM service) as well as information concerning how these LACs can reach destination subscribers. This type of addressing for outbound calls is called outgoing call tunnel addressing (OCT).

Further, the LTM service must make outbound LAC selection dependent on the type of communication fabric the destination subscriber is attached to. For example, if the destination subscriber is attached to the Public Switched Telephone Network (PSTN), then any LAC/NAS will be able reach the subscriber; however, it is preferable to have a lowest cost LAC/NAS to be selected. In contrast, a LAC/Digital Subscriber Line Access Multiplexer (DSLAM) will require the use of certain LACs that have a connection to the Digital Subscriber Line Access Multiplexer (DSLAM)(s) that have access to the destination subscriber.

The L2TP Tunnel Merging and Management (LTM) service determines the actions that it takes depending on the gender (e.g., LTM, LAC, LNS) of the LAC/LNS device that it is communicating with. The purpose of this is to both appear as an actual terminating L2TP Access Concentrator (LAC) and L2TP Network Server (LNS) to a real LNS and LAC, respectively, and to add the functionality needed to allow the L2TP tunnel merging and management (LTM) service abstraction.

As those skilled in the art know, L2TP can be used to setup a tunnel inside of one ATM VC (Virtual Channel), as well as the possibility of having multiple tunnels inside of a single ATM VC. However, as is also known in the art, quality of service (QoS) in ATM is performed on a ATM VC or ATM VP (Virtual Path) basis. So using existing hardware, if one or more L2TP tunnels were setup in one ATM VC with multiple L2TP calls in each L2TP tunnel, then the ATM QoS would not be fairly allocated to each L2TP call. Instead, as those skilled in the art will readily see, the QoS function would be performed across all L2TP calls and its effect would be dependent on which packets were sent at which times. Further, it can be considered that there would be a QoS crosstalk effect occurring, between L2TP calls, if there is only one QoS for the entire ATM VC.

To lower this QoS crosstalk effect, the L2TP tunnel merging and management (LTM) service will setup a L2TP tunnel inside of a single ATM VP instead of a single ATM VC. Then the L2TP calls would be established inside of separate ATM VCs, and so each would receive their own QoS functions.

As a different option, the L2TP Tunnel Merging and Management (LTM) service could establish a single L2TP tunnel inside of a single ATM VP; however, the LTM service would also manage the placing of multiple L2TP calls into a single ATM VC. This would be done, to improve scalability. The L2TP tunnel merging and management (LTM) service would use administratively defined parameters to determine the number of L2TP tunnels that would be grouped into a single ATM VC. Alternatively, the L2TP Tunnel Merging and Management (LTM) service could dynamically realign the access/trunk calls between multiple VCs in a single VP to ensure optimal QoS for all calls.

Finally, the LTM service could group L2TP calls of various pre-paid/pre-defined QoS levels together into ATM VCs. For example, if there were three levels of service, e.g., Gold, Silver and Bronze, offered to a user, then only like service levels would be placed into the same VC. Then three administrative policies could be given where, for example, Gold users are placed into a VC by themselves, Silver users only have four L2TP calls per VC, and Bronze users have ten L2TP calls per VC.

Figure 8:
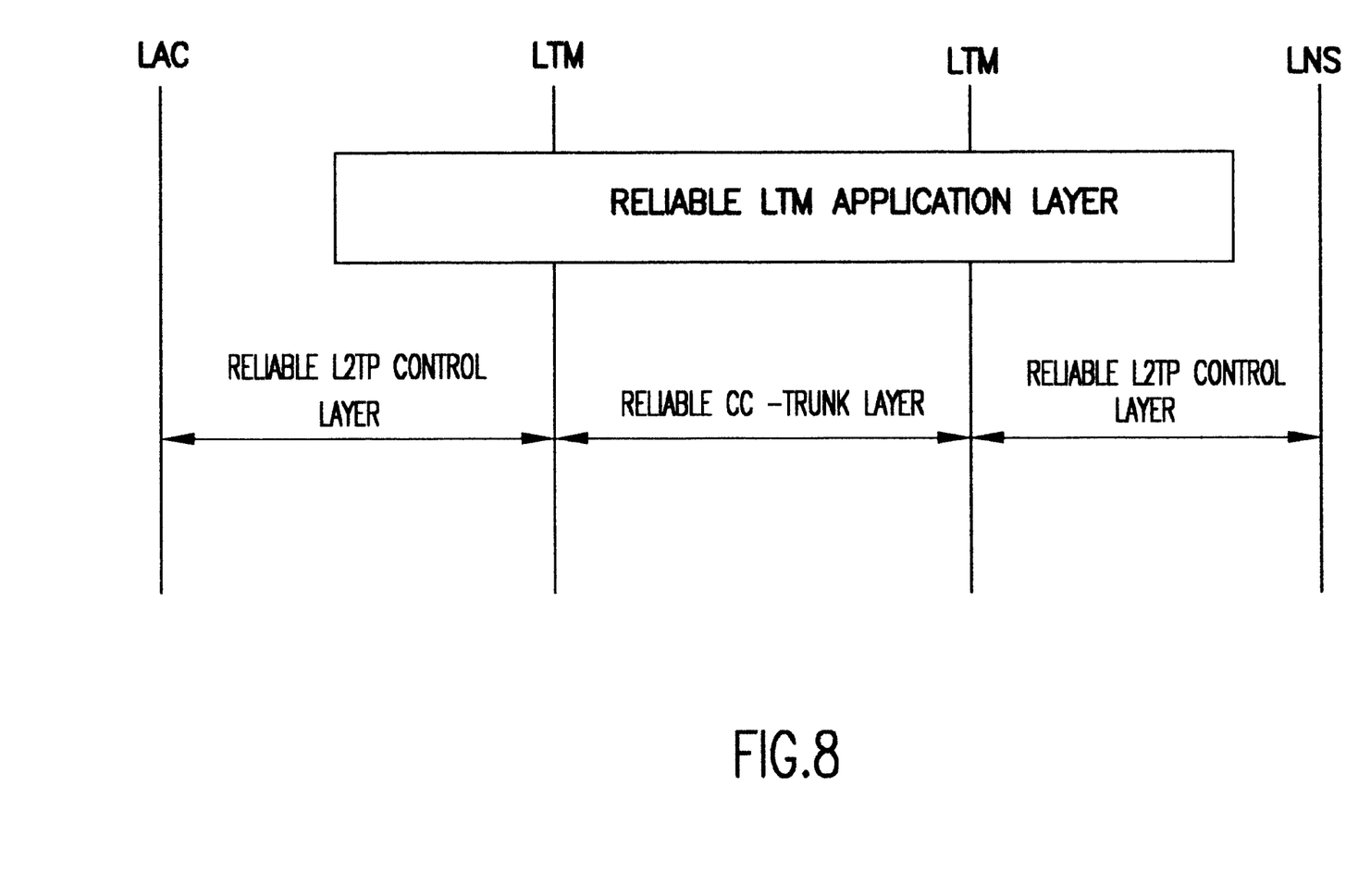
FIG. 8 is a diagram of the reliable LTM application layer.

While the L2TP Tunnel Merging and Management (LTM) service adds much functionality to the traditional point-to-point tunnel, the use of the LTM service also causes a problem as opposed to using the L2TP tunnel in a traditional point-to-point fashion. As shown in FIG. 8, each of the L2TP/CC-Trunk layers are in themselves reliable; however, the individual L2TP Access Concentrator (LAC), LTMs, and L2TP Network Servers (LNSs) themselves may not be. It should be considered that buffer allocation failures, error conditions, and software bugs can cause packets to be lost. This then would cause a call or tunnel to be hung until either a human cleared it, or (if a timer was put into the L2TP application layer) the machine clears the call. This is not an acceptable condition to allow a hang condition to occur, so the "Reliable L2TP tunnel merging and management (LTM) Application Layer" is used to resolve this problem.

Two methods are used by the LTM service to resolve these hang conditions. The first is that the LTM edge devices will not only transport, but also monitor the LAC/LNS packets used to establish L2TP calls. If the LTM edge device determines, by the use of timeouts, that a timeout condition has occurred, then the LTM edge devices will clear the call. The second method, which is more difficult, is that the LTM edge devices will determine which packet has been lost, and resend it. This second method will then avoid having to clear the call if a control message is lost.

As has been described herein, one of the effects of using the LTM service is that the number of L2TP tunnels can be drastically lowered. This is achieved by the LTM service abstracting the interface between the L2TP Access Concentrator (LAC) and L2TP Network Server (LNS) and multiplexing L2TP calls between different L2TP access tunnels.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A system for establishing connections between a plurality of access concentrators connected to respective ones of a like plurality of Network Access Servers (NASs) and a plurality of network servers connected to a plurality of Service Providers (SPs) in a network using a point-to-point tunneling protocol, comprising a tunneling merger and management service having a plurality of tunneling merger and management edge devices, each said access concentrator being connected to a tunneling merger and management edge device and each said network servers being connected to a tunneling merger and management edge device, the tunneling merger and management service abstracting the point-to-point tunneling protocol to become an access protocol so that direct connections are not required between access concentrators and network servers by simulating to an access concentrator a connection to a network server and simulating to a network server a connection to an access concentrator.

2. The system recited in claim 1, wherein the plurality of SPs is less in number than the plurality of NASs.

3. The system recited in claim 1, wherein the tunneling protocol is a Layer two Tunneling Protocol (L2TP) and the access concentrators are L2TP Access Concentrators (LACs) and the network servers are L2TP Network Servers (LNSs), the tunneling merger and management service being an L2TP Tunneling Merger and Management (LTM) service and the tunneling merger and management edge devices being LTM edge devices.

4. The system recited in claim 3, wherein the addition of another LAC is accomplished by re-routing L2TP tunnels within the LTM service without reconfiguration of the LNSs.

5. The system recited in claim 3, wherein the addition of another LNS is accomplished by re-routing L2TP tunnels within the LTM service without reconfiguration of the LACs.

6. The system recited in claim 3, wherein the addition of another LAC is accomplished by re-routing L2TP tunnels within the LTM service without reconfiguration of the LNSs and the addition of another LNS is accomplished by re-routing L2TP tunnels within the LTM service without reconfiguration of the LACs.

7. The system recited in claim 3, wherein an internal trunk protocol (INT protocol) is used to carry needed information between LTM edge devices to establish ingress/egress L2TP access calls inside of separate L2TP access tunnels on opposite LTM edge devices.

8. The system recited in claim 3, wherein the LTM services perform a coordinated and even distribution of L2TP tunnel resources including bandwidth, Access/Trunk calls, and Access/Trunk tunnels.

9. The system recited in claim 8, wherein the LTM services determine a need for both Trunk and Access resources and establishing new Trunk/Access tunnels or new multi-Virtual Channels (VCs) inside existing tunnels to provide needed additional resources.

10. The system recited in claim 8, wherein the LTM services determine excess resources on both Trunk and Access entities and release Trunk/Access Tunnels and multi-VCs inside tunnels to provide the needed additional resources.

11. The system recited in claim 7, wherein the LTM service appears to terminate the network layer of the ingress L2TP Access tunnels, ingress L2TP Access calls, and associated ingress L2TP access payloads at an LTM edge device, thereby allowing the LTM service to transparently route the Access L2TP calls and associated payloads to a proper egress Access L2TP tunnel.

12. The system recited in claim 11, wherein routing of L2TP access calls and associated data is based on information provided by an L2TP tunnel layer.

13. The system recited in claim 12, wherein the LTM service passes the Internet Protocol (IP) header and User Datagram Protocol (UDP) header information and performs as needed updating of UDP and IP check sums.

14. The system recited in claim 3, wherein an LAC communicates a desired destination service provider to the LTM service by the use of Incoming Call Tunnel (ICT) addressing.

15. The system recited in claim 14, wherein the LTM service uses the ICT addressing and selects the appropriate destination LNS based on the service provider selected by the ICT addressing.

16. The system recited in claim 3, wherein the LTM service provides a coordinated directory service in which the LTM service selects an appropriate LAC that should be used to make an outgoing call.

17. The system recited in claim 16, wherein the selection of different processing is based on a type of communication fabric a destination subscriber is attached to.

18. The system recited in claim 3, wherein the LTM service changes its addressing method depending if it is attached to another LTM, LAC or LNS.

19. The system recited in claim 1, wherein the tunneling merger and management service establishes a single access/trunk tunnel over an Asynchronous Transfer Mode (ATM) Virtual Path (VP) instead of a Virtual Channel (VC), thereby allowing individual access/trunk calls to be established over a VC instead of all calls being established inside of a single tunnel/VC.

20. The system recited in claim 19, wherein a single access/trunk call is established by the tunneling merger and management service within a single ATM VC, thereby ensuring no access/trunk call interaction QoS between multiple access/trunk calls.

21. The system recited in claim 19, wherein multiple access/trunk calls are established by the tunneling merger and management service inside of a single ATM VC, thereby avoiding using as many network resources as if each access/trunk call were assigned to a single ATM VC while still improving access/trunk call interaction of Quality of Service (QoS) between multiple access/trunk calls in a single VC.

22. The system recited in claim 19, wherein the tunneling merger and management service dynamically realigns access/trunk calls between multiple VCs in a single VP to ensure optimal Quality of Service (QoS) for all calls.

23. The system recited in claim 19, wherein the tunneling merger and management service groups multiple access/trunk calls into a single ATM VC dependent on a specified Quality of Service (QoS) of the access/trunk call.

24. The system recited in claim 3, wherein the LTM service further comprises an L2TP access call watchdog state processing means to detect a loss of a tunnel control message.

25. The system recited in claim 24, wherein the LTM service clears an access/trunk call to ensure that an L2TP access call is not hung for a time exceeding a predetermined period of time.

26. The system recited in claim 24, wherein the LTM service dynamically regenerates a lost tunnel control message to compensate for a hung access call.

27. The system recited in claim 3, wherein the LTM service coordinates network services.

28. The system recited in claim 27, wherein the LTM service coordinates planned system maintenance, administration and reconfiguration.

29. The system recited in claim 27, wherein the LTM service provides coordinated security for tunnel access.

30. A method for establishing connections between a plurality of access concentrators connected to respective ones of a like plurality of Network Access Servers (NASs) and a plurality of network servers connected to a plurality of Service Providers (SPs) in a network using a point-to-point tunneling protocol, comprising the steps of:
providing a tunneling merger and management service having a plurality of tunneling merger and management edge devices, each said access concentrator being connected to a tunneling merger and management edge device and each said network servers being connected to a tunneling merger and management edge device; and
abstracting by the tunneling merger and management service the point-to-point tunneling protocol to become an access protocol so that direct connections are not required between access concentrators and network servers by simulating to an access concentrator a connection to a network server and simulating to a network server a connection to an access concentrator.

31. The system recited in claim 30, wherein the plurality of SPs is less in number than the plurality of NASs.

32. The method recited in claim 30, wherein the tunneling protocol is a Layer two Tunneling Protocol (L2TP) and the access concentrators are L2TP Access Concentrators (LACs) and the network servers are L2TP Network Servers (LNSs), the tunneling merger and management service being an L2TP Tunneling Merger and Management (LTM) service and the tunneling merger and management edge devices being LTM edge devices.

33. The method recited in claim 32, further comprising the step of adding another LAC by re-routing L2TP tunnels within the LTM service without reconfiguration of the LNSs.

34. The method recited in claim 32, further comprising the step of adding another LNS by re-routing L2TP tunnels within the LTM service without reconfiguration of the LACs.

35. The method recited in claim 32, further comprising the steps of:
adding another LAC by re-routing L2TP tunnels within the LTM service without reconfiguration of the LNSs; and
adding another LNS by re-routing L2TP tunnels within the LTM service without reconfiguration of the LACs.

36. The method recited in claim 32, further comprising the step of using an internal trunk protocol (INT protocol) to carry needed information between LTM edge devices to establish ingress/egress L2TP access calls inside of separate L2TP access tunnels on opposite LTM edge devices.

37. The method recited in claim 32, further comprising the step of performing by the LTM services a coordinated and even distribution of L2TP tunnel resources including bandwidth, Access/Trunk calls, and Access/Trunk tunnels.

38. The method recited in claim 37, further comprising the steps of:

determining by the LTM services a need for both Trunk and Access resources; and     establishing by the LTM services new Trunk/Access tunnels or new multi-Virtual Channels (VCs) inside existing tunnels to provide needed additional resources.

39. The method recited in claim 37, further comprising the steps of:

determining by the LTM services excess resources on both Trunk and Access entities; and     releasing by the LTM services Trunk/Access Tunnels and multi-VCs inside tunnels to provide the needed additional resources.

40. The method recited in claim 36, further comprising the step by the LTM of appearing to terminate the network layer of the ingress L2TP Access tunnels, ingress L2TP Access calls, and associated ingress L2TP access payloads at an LTM edge device, thereby allowing the LTM service to transparently route the Access L2TP calls and associated payloads to a proper egress Access L2TP tunnel.

41. The method recited in claim 40, further comprising the step of routing of L2TP access calls and associated data based on information provided by an L2TP tunnel layer.

42. The method recited in claim 41, further comprising the step of passing the LTM service Internet Protocol (IP) header and User Datagram Protocol (UDP) header information with as needed processing of updating UDP and IP check sums.

43. The method recited in claim 32, further comprising the step of communicating by an LAC a desired destination service to the LTM service by the use of Incoming Call Tunnel (ICT) addressing.

44. The method recited in claim 43 wherein the LTM service uses the ICT addressing and selects the appropriate destination LNS based on the service provider selected by the ICT addressing.

45. The method recited in claim 32, further comprising the steps of:

providing by the LTM service a coordinated directory service; and     selecting by the LTM service an appropriate LAC that should be used to make an outgoing call.

46. The method recited in claim 45, further comprising the step of selecting different processing based on a type of communication fabric a destination subscriber is attached to.

47. The method recited in claim 32, further comprising the step of changing by the LTM service its addressing method depending if it is attached to another LTM, LAC or LNS.

48. The method recited in claim 29, further comprising the step of establishing by the tunneling merger and management service a single access/trunk tunnel over an Asynchronous Transfer Mode (ATM) Virtual Path (VP) instead of a Virtual Channel (VC), thereby allowing individual access/trunk calls to be established over a VC instead of all calls being established inside of a single tunnel/VC.

49. The method recited in claim 48, further comprising the step of establishing by the tunneling merger and management service a single access/trunk call within a single ATM VC, thereby ensuring no access/trunk call interaction Quality of Service (QoS) between multiple access/trunk calls.

50. The method recited in claim 48, further comprising the step of establishing by the tunnel merger and managing service multiple access/trunk calls are inside of a single ATM VC, thereby avoiding using as many network resources as if each access/trunk call were assigned to a single ATM VC while still improving access/trunk call interaction of Quality of Service (QoS) between multiple access/trunk calls in a single VC.

51. The method recited in claim 48, further comprising the step of dynamically realigning by the tunnel merger and management service access/trunk calls between multiple VCs in a single VP to ensure optimal Quality of Service (QoS) for all calls.

52. The method recited in claim 48, further comprising the step of grouping by the tunnel merger and management service multiple access/trunk calls into a single ATM VC dependent on a specified Quality of Service (QoS) of the access/trunk call.

53. The method recited in claim 29, further comprising the step of detecting by the LTM service a loss of a tunnel control message by the use of watch dog state processing.

54. The method recited in claim 53, further comprising the step of clearing by the LTM service an access/trunk call to ensure that an L2TP access call is not hung for a time exceeding a predetermined period of time.

55. The method recited in claim 53, further comprising the step of dynamically regenerating by the LTM service a lost tunnel control message to compensate for a hung access call.

56. The method recited in claim 30, wherein the tunneling protocol is a Layer two Tunneling Protocol (L2TP) and the access concentrators are L2TP Access Concentrators (LACs) and the network servers are L2TP Network Servers (LNSs), the tunneling merger and management service being an L2TP Tunneling Merger and Management (LTM) service and the tunneling merger and management edge devices being LTM edge devices.

57. The method recited in claim 56, further comprising the step of adding another LAC by re-routing L2TP tunnels within the LTM service without reconfiguration of the LNSs.

58. The method recited in claim 56, further comprising the step of adding another LNS by re-routing L2TP tunnels within the LTM service without reconfiguration of the LACs.

59. The method recited in claim 32, wherein the LTM service coordinates network services.

60. The method recited in claim 59, wherein the LTM service coordinates planned system maintenance, administration and reconfiguration.

61. The method recited in claim 59, wherein the LTM service provides coordinated security for tunnel access.

\* \* \* \* \*